United States Patent [19]

Beaton

[11] Patent Number: 4,516,476

[45] Date of Patent: May 14, 1985

[54] ACTUATOR ASSEMBLY FOR AN INDUSTRIAL MANIPULATOR OR THE LIKE

[75] Inventor: Brian M. Beaton, Erie, Pa.

[73] Assignee: Lord Corporation, Erie, Pa.

[21] Appl. No.: 484,783

[22] Filed: Apr. 14, 1983

[51] Int. Cl.³ .......................................... F01B 29/04
[52] U.S. Cl. ........................................ 92/59; 92/61;
92/128; 901/50; 414/749
[58] Field of Search ............... 92/61, 146, 161, 59,
92/128; 414/749, 751, 752, 753, 1; 901/50, 16,
37; 339/15, 16, 32, 33; 91/508

[56] References Cited

U.S. PATENT DOCUMENTS

| 455,021 | 6/1891 | Krehbiel | 339/16 R |
|---|---|---|---|
| 2,227,743 | 1/1941 | Bone | 339/32 R |
| 3,079,009 | 2/1963 | Davis | 92/161 |
| 3,371,583 | 3/1968 | Blatt | 92/61 |
| 3,522,838 | 8/1970 | Ott | 414/753 |
| 3,818,800 | 6/1974 | Bertaux | 92/169 |
| 3,851,243 | 11/1974 | Banner | 339/32 R |
| 4,169,404 | 10/1979 | Tsuchihashi | 91/508 |
| 4,351,628 | 9/1982 | Drexel et al. | 92/165 PR |
| 4,459,898 | 7/1984 | Harjar et al. | 92/61 |

FOREIGN PATENT DOCUMENTS

| 2123238 | 5/1971 | France | 414/1 |
|---|---|---|---|
| 2256804 | 8/1975 | France | 414/1 |
| 54-72842 | 6/1979 | Japan | 414/749 |

OTHER PUBLICATIONS

Robert Bosch Co., Linear Pneumatic Actuator Catalog, No. AKN001, Published 2/1980.

*Primary Examiner*—Robert E. Garrett
*Assistant Examiner*—Richard S. Meyer
*Attorney, Agent, or Firm*—Joseph H. Heard

[57] ABSTRACT

The assembly includes a plurality of linear actuator modules or units capable of being readily interconnected in various transversely extending orientations relative to each other. The units are so constructed as to effect internal conduction of electrical and fluid energy sequentially between each other and to an energy consumer affixed to the terminal one of them. Each unit includes a pair of elongate and reciprocatorily moveable support members having energy conducting passageways extending therethrough and alignable with desired ones of a plurality of energy receiving openings provided within the frame of the next unit.

5 Claims, 5 Drawing Figures

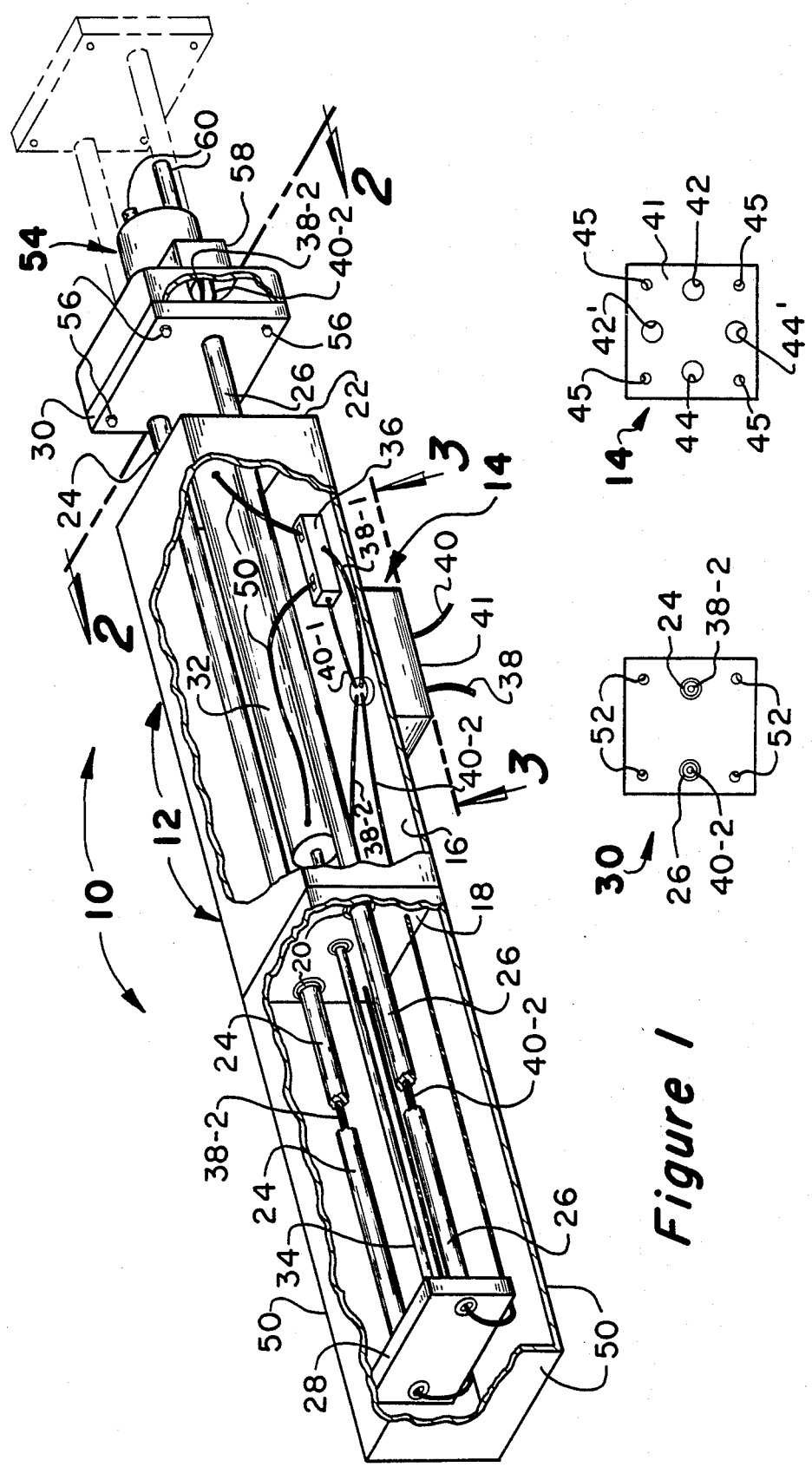

4,516,476

ACTUATOR ASSEMBLY FOR AN INDUSTRIAL MANIPULATOR OR THE LIKE

FIELD OF THE INVENTION

This invention relates to linear drive mechanisms or actuators of the type employed for imparting controlled movement to an article gripper or other positionable component of an industrial "robot" or similar article manipulator. The invention more specifically relates to a modular assembly of linear actuator units which are so constructed as to be readily connectable in transversely extending relationship and in various desired orientations relative to each other, and which are free from exposed energy conducting lines, conduits, cables and the like.

BACKGROUND OF THE INVENTION

Many industrial manipulators utilize both electrical and fluid energy for powering and/or controlling the various energy consuming units associated therewith. In a typical manipulator, such units normally consist of at least one and usually a greater number of motion-producing actuators, and may also include the manipulator member or unit which is positioned by the actuator units. Energy of the aforesaid types is normally supplied independently to each of the energy consuming units by means of flexible cables, conduits, lines and similar connectors which are disposed exteriorally of the units and depend freely therefrom so as to accommodate relative motion between them. Such exposed energy conductors are highly undesirable. In addition to being subjected to the possibly corrosive environment of their particular use, they are subject to entanglement with each other and/or with structures, vehicles or persons in the immediate vicinity thereof. An entanglement normally necessitates at least temporary shut-down of the manipulator, and may also cause structural damage and/or personal injury.

DESCRIPTION OF THE PRIOR ART

In recognition of the problems presented by exposed energy conductors, it has heretofore been proposed to provide the energy consuming actuator units of some industrial manipulators or similar assemblies with energy conductors which are located at least partially within the units themselves: See, e.g., U.S. Pat. Nos. 3,404,575, 4,218,166, and 4,351,628. In the modular actuator assemblies of 3,404,575 and 4,351,628, a plurality of linear actuator units are connectable to and in axially aligned relationship with each other, such that the output motion thereof is along a single "X" axis only. While such output motion is sufficient for some utilizations, in others it is highly desirable for the output motion of an assembly of linear actuator units to be along a plurality of mutually perpendicular axes X, Y, and/or Z. The individual actuator units of an assembly of the latter type extend transversely relative to each other with each adjacent pair thereof forming a generally T-shaped array. The inherently greater difficulty of enclosing all energy conductors within a modular assembly of the type wherein the individual linear actuator units extend transversely relative to each other, rather than in axial alignment, is compounded by the desirability of not requiring that each actuator unit of the assembly be connectable in only a single transverse orientation to another assembly unit. For example, if a first actuator unit of the assembly realizes output motion along an X axis, the transverse orientation of a thereto connected second unit desirably should be selected so as to allow its output motion to be along either the Y or Z axis.

SUMMARY OF THE INVENTION

The present invention provides an actuator assembly comprised of at least first and second elongate actuator units, each adapted to produce output motion in the direction of its central axis, which are interconnected so as to define a generally T-shaped array wherein the second unit extends transversely of and is moveable laterally by the first unit. The units may be and preferably are of substantially identical construction. Each utilizes electrical and fluid energy during its operation and includes an elongate rigid frame having inlet openings for receiving electricity and pressurized fluid conducted thereto. A pair of elongate support members are mounted by and project forwardly from the frame of each unit in laterally spaced and substantially parallel relationship to each other for simultaneous longitudinal movement relative to the unit's frame under the impetus of drive means carried by such frame and driveably connected to the support members. The support members of each unit have passageways extending longitudinally thereof for conducting electricity and pressurized fluid forwardly from the unit's frame through the support members and to the forwardmost end portions thereof. The second unit of the assembly is connected to the forwardmost end portions of the moveable support members of the first unit for lateral movement in response to longitudinal movement of the support members of the first unit. The energy inlet openings of the second unit include a first pair of inlet openings aligned with the support members of the first unit when the second unit is mounted in one transverse orientation relative to the first unit and also include a second pair of inlet openings which similarly are aligned with the support members of the first unit when the second unit is mounted in another transverse orientation relative to the first unit. In either of the aforesaid orientations of the second unit, therefore, electricity and pressurized fluid are conducted to the second unit from the frame and through the support members of the first unit without the use of any exposed conduits, cables, lines, or the like.

The energy conducted to the second unit is employable for effecting controlled operation of the second unit and a portion thereof may similarly be conducted through the support members of the second unit to either a third actuator unit or to an energy consuming manipulator component connected to the forwardmost end portions of such support members. When the assembly includes a total of three actuator units, the respective output motions thereof may be along X, Y, and Z axes or X, Z, and Y axes.

In a preferred embodiment thereof, the elongate support members of each actuator unit project rearwardly as well as forwardly from the frame of such unit, and the electrical and fluid energy is conducted to the rear ends of the support members and then forwardly through the passageways therewithin. In an alternative embodiment, the passageways within the support members extend only between the forward ends of the support members and sections thereof disposed at all times within the confines of the frame of the unit, and the electrical and fluid energy is introduced into such passageways at the aforesaid sections thereof. The interconnection between the support member and the drive means by which they are axially driven is preferably located, in both embodiments, adjacent the rearward and distal from the forward end portions of support members.

DESCRIPTION OF THE DRAWINGS

Other features of the invention will be apparent from the following description of illustrative embodiments thereof, which should be read in conjunction with the accompanying drawings, in which:

FIG. 1 is a perspective view of a linear actuator unit in accordance with the invention, some components of the unit being partially broken away to reveal interior details, and of an illustrative industrial manipulator component supported by such unit;

FIG. 2 is a front elevational view of the support plate and support members of the actuator unit;

FIG. 3 is a bottom plan view of that portion of the frame of the unit having energy inlet openings therein;

DESCRIPTION OF THE PREFERRED EMBODIMENTS

Figure 4:
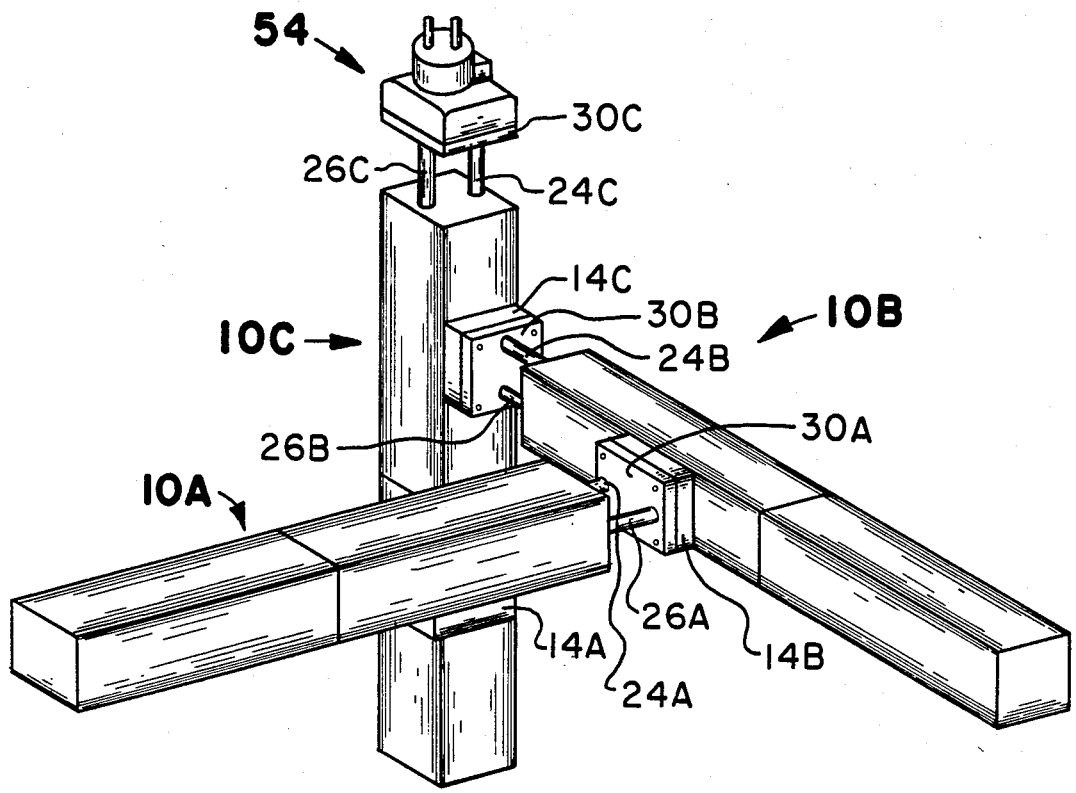
FIG. 4 is a perspective view of an actuator assembly formed of three of the actuator units connected in mutually perpendicular relationship to each other so as to permit positioning of an industrial manipulator component along three mutually perpendicular axes.

The actuator unit 10 shown in FIG. 1 includes a rigid housing or frame comprised of an elongate box-like main frame section 12 and a smaller box-like frame section 14 formed integrally with or fixedly secured to and centrally of one side wall 16 (the lower wall as viewed in FIG. 1) of main frame section 12. The rear wall 18 of frame section 12 is provided with a pair of spaced bores, containing suitable bearings 20, which are in respective alignment with identical bearing-containing bores (not shown) provided in association with front wall 22 of frame section 12. A pair of elongate rigid support members 24, 26, which are each of tubular construction and circular cross-sectional shape, respectively extend through and beyond aligned ones of the aforesaid bearing-containing bores of walls 18, 22 and are mounted thereby in spaced parallel relationship to each other and to the central axis of frame section 12 for longitudinally sliding movement relative to frame section 12. The rearmost end portions of support members 24, 26 are respectively received within bores of a rigid connector plate 28 fixedly secured thereto in any suitable manner. The forward end portions of support members 24, 26 are similarly respectively received within bores of a front plate 30 fixedly secured thereto.

Controlled axial sliding movement of support members 24, 26 is produced during operation of unit 10 by drive means carried by main frame section 12 of the unit. Such drive means illustratively consists of a conventional fluid (e.g., air or hydraulic fluid) powered linear device, having relatively movable cylinder and rod components 32, 34, controlled by an electrically operated valve mechanism 36. Cylinder 32 and valve mechanism 36 are fixedly mounted in any suitable manner upon wall 16 of main frame section 12. Cylinder 32 and its associated rod 34 extend parallel to the longitudinal axis of unit 10. Rod 34 projects rearwardly from cylinder 32 through a bore within rear wall 18 of frame section 12, and the rear end thereof is fixedly secured to the plate 28 interconnecting the rear end portions of support members 24, 26. Rod 34 is shown in FIG. 1 in its fully extended position. Retraction of rod 34 into cylinder 32 effects forward axial movement of support members 24, 26 and simultaneous forward linear displacement of the thereto connected front plate 30 towards or to the forwardmost position thereof illustrated by phantom lines in FIG. 1.

Controlled extension and retraction of rod 34 and the thereby produced forward-rearward linear movement of plate 30 of course result from control by valve mechanism 36 of the flow of pressurized fluid to and from the opposite end portions of cylinder 32. Unit 10 and at least its valve mechanism 36 therefore must be supplied with pressurized fluid and also with electrical power and control signals. Fluid and electrical energy is conducted to the unit 10 of FIG. 1 via conduits 38, 40 which respectively communicate with suitable sources (not shown in FIG. 1) of pressurized fluid and electricity and which respectively enter the frame of unit 10 through inlet openings (see FIG. 3) 42 or 42' and 44 or 44' provided within the bottom (in the FIG. 1 orientation of unit 10) wall 41 of frame section 14. Within frame section 14, each conduit 38, 40 separates into two branches which both pass into main frame section 12 through a suitable opening provided within wall 16 thereof. One branch 40-1 of conduit 40 conducts electrical energy and control signals to valve mechanism 36, and one branch 38-1 of conduit 38 similarly conducts pressurized fluid to the valve mechanism. Pressurized fluid is conducted to and from valve mechanism 36 and opposite end portions of cylinder 32 by conduits 50 extending therebetween. Flexible second branches 38-2, 40-2 of conduits 38, 40 extend through suitable openings within rear wall 18 of frame section 12 and then rearwardly from such wall along laterally spaced paths extending to and underlying the plate 28 interconnecting the rear end portions of support members 24, 26. Branch 38-2 of fluid conduit 38 then extends upwardly into and forwardly through the central energy conducting passageway or bore of support member 24. Branch 40-2 of electrical conduit 40 similarly extends upwardly into and then forwardly through the energy conducting passageway of support member 26. A lightweight enclosure 50, which may be formed of relatively thin sheet metal or comparable material, projects outwardly from wall 18 of main frame section 12 and encloses all of the aforesaid components located rearwardly of wall 18. Enclosure 50 prevents the sections of conduit branches 38-2 and 40-2 between wall 18 and plate 30 from depending from unit 10 when plate 30 occupies a position forwardly of its rearmost one illustrated in FIG. 1. Enclosure 50 also shields all the components rearwardly of frame section 12 from the ambient environment and prevents the same from engaging or being engaged by any objects, structures or persons in the immediate vicinity of unit 10.

The branches 38-2 and 40-2 of conduits 38, 40 within the respective passageways of support members 24, 26 pass from the forwardmost end portions of such members and from the encircling bores of the front plate 30 connected to them. In addition to its aforesaid energy conducting bores, plate 30 is provided at each of its four corners with bores 52 (FIG. 2) adapted to receive bolts or similar fasteners for the purpose of securing another energy consumer to the front face of the plate for forward-rearward movement in unison with it. By way of illustration, FIG. 1 shows a fluid-operated and electrically-controlled article gripper 54 so secured to the front of plate 30 by bolts 56. The branch conduits 38-2, 40-2 which pass through plate 30 extend forwardly to a valve mechanism 58 which forms part of unit 54 and which controls the movements of the unit's gripper components 60.

The single linear actuator 10 shown in FIG. 1 is effective to internally conduct fluid and electrical energy to energy consuming unit 54 while imparting translatory movement to such unit along an "X" axis coincident with the longitudinal axis of actuator 10. It frequently is desirable, however, to position an energy consumer such as unit 54 along a plurality of axes extending in mutually transverse relationship to each other. This result may be readily realized by interconnecting a plurality of the actuator units 10 in transversely extending relationship to each other in a manner such as illustrated in FIG. 4 of the drawings. As shown in FIG. 4, the front plate 30A of a first frame-mounted actuator unit 10A and the wall 41 (FIG. 3) of frame section 14B of a second actuator unit 10B are bolted to one another such that the two actuators extend transversely relative to each other and form a generally T-shaped array. Unit 10B receives electrical and fluid energy from unit 10A via its support members 24A, 26A and is laterally displaceable by axial movement of such support members. The longitudinal axis of actuator unit 10B illustratively extends horizontally along a "Z" axis perpendicular to the axis of unit 10A. If desired, a second generally T-shaped array of units 10 may be similarly formed by bolting the front plate 30B of actuator unit 10B to the wall 41 (FIG. 3) of frame section 14C of a third actuator unit 10C which is transversely oriented such that its longitudinal axis extends vertically or in the "Y" direction. Unit 10C receives electrical and fluid energy from support members 24B, 26B of unit 10B and is displaceable laterally in response to axial movement of support members 24B, 26B and/or 24A, 26A. A final energy consumer such as the previously described gripper unit 54 is bolted to plate 30C of actuator unit 10C and is supplied with electrical and fluid energy via its support members 24C, 26C. The FIG. 4 assembly permits unit 54 to be positioned as desired along three mutually perpendicular X, Z, and/or Y axes, and neither requires nor employs any exposed and troublesome cables, conduits or the like for conducting energy to its various units. The unencumbered exterior design of the FIG. 4 assembly is further enhanced by the fact that the rod component 34 (FIG. 1) of each actuator unit 10 does not extend forwardly from main frame section 12, but rather is housed at all times within such main frame section and the enclosure 50 disposed rearwardly thereof.

The openings provided within wall 41 of frame section 14 and within front plate 30 of each actuator unit 10 are so arranged as to permit, in each T-shaped array of first and second interconnected and transversely extending units 10, mounting of the second unit in any desired one of a plurality of possible transverse orientations relative to the first unit. As it is apparent from FIGS. 2 and 3 of the drawings, fastener receiving bores 45 of wall 41 of frame section 14 of a first unit 10 will align with the fastener receiving bores 52 of front plate 30 of a transversely extending second unit 10 irrespective of whether the second unit's transverse orientation is a vertical or a horizontal one. Further, in either of such transverse orientations of the second unit relative to the first unit, the forward ends of the support members 24, 26 received within the bores of plate 30 of the first unit will align with one or the other of the two sets of energy receiving openings 42, 44 or 42', 44' of wall 41 of frame section 14 of the second actuator unit. Thus, in the FIG. 4 array of transversely extending units 10A, 10B, the energy conducting support members 24A, 26A of unit 10A respectively align with the energy receiving openings 42, 44 of section 14B of unit 10B when such unit 10B extends horizontally, as shown, and would respectively align with energy receiving openings 42', 44' of unit 10B if its transverse orientation were vertical rather than horizontal. Similarly, in the transversely extending array of actuator units 10B, 10C of FIG. 4, the support members 24B, 26B of actuator unit 10B respectively align with energy inlet openings 42, 44 of frame section 14C of unit 10C when the transverse orientation of the latter unit relative to the former is vertical, as shown, and would align with the second set of openings 42', 44' of unit 10C if the latter unit extended horizontally rather than vertically.

The aforesaid capability of units 10 to effect continuous internal conduction of electrical and fluid energy between one another even when mounted in various desired relative transverse orientations is particularly desirable when the energy conducting components of each unit are more sophisticated than the simplified components shown for purposes of illustration in the drawings and previously described. In actual commercial embodiments of the units 10, the base sections 14 and/or 16 of each unit could and preferably would be formed with an internal fluid manifold and with internal fluid passageways in lieu of the fluid-conducting conduits shown within the base sections of the unit in FIG. 1 of the drawings. The fluid manifold of each unit 10 could and preferably would communicate directly with the fluid inlet openings 42, 42 (FIG. 3) of base section 14. The fluid conduit branch 38-2 of each unit 10 except the terminal one could then be terminated at a suitable fitting establishing communication between it and the rear of the passageway within support member 24. Fluid introduced into the passageway and passing forwardly through member 24 would be discharged through the therewith aligned one of the fluid inlet openings 42 or 42' of base section 14 of the next unit 10. Suitable seals or the like would of course be provided in association with each unit's plate 30 and/or wall 41 to prevent leakage of fluid from the junctures between interconnected ones of the units 10.

It will also be appreciated that in the commercial construction of each unit 10, mating plug-type connectors might be provided in association with the front end portion of support member 26 and the electrical inlet openings 44, 44'.

Figure 5:
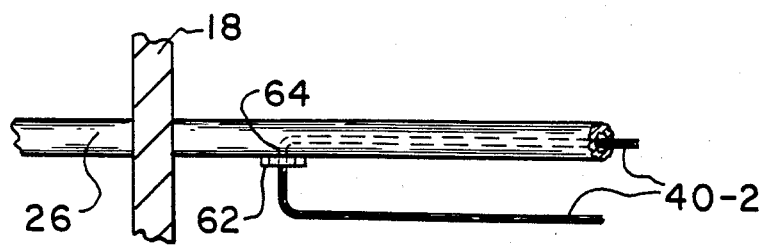
FIG. 5 is a fragmentary side elevational view illustrating an alternative construction of the actuator support members and associated components.

FIG. 5 of the drawings illustrates an alternative embodiment wherein the energy conducting passageway within support member 26 does not extend the full length of such member, but rather originates and extends forwardly from a section of member 26 disposed at all times within main frame section 12 of unit 10. The branch 40-2 of electrical conduit 40 enters support member 26 through a suitable fitting 62 and transverse opening 64 provided in association with the aforesaid section of support member 26. Support member 24 would be similarly constructed and connected to fluid conduit branch 38-2. The alternative construction of FIG. 5 has the advantage of minimizing the length of the conduits by which support members 24, 26 are supplied with energy, and may be employed in lieu of the FIG. 1 arrangement when the strength of members 24, 26 is not unduly impaired by the provision of the transversely extending openings, such as opening 64, therein.

Although preferred embodiments of the invention have been specifically described and shown, it is to be understood that this was for purposes of illustration only, and not for purposes of limitation, the scope of the invention being in accordance with the hereinafter-presented claims.

I claim:

1. An actuator assembly for an industrial manipulator or the like, comprising:

a plurality of elongate actuator units each adapted to produce linear output motion in the direction of its central axis, means for interconnecting at least a first one of said units and a second one of said units to define a generally T-shaped array wherein said second unit extends transversely of and is moveable laterally by said first unit;

each of said units utilizing electrical and fluid energy during operation thereof and including an elongate rigid frame having inlet openings for receiving electricity and pressurized fluid conducted thereto, a pair of elongate support members mounted by and projecting forwardly from said frame in laterally spaced and substantially parallel relationship to each other for longitudinal movement in unison with each other relative to said frame, drive means carried by said frame and driveably connected to said support members for imparting said movement thereto, said support members having passageways extending longitudinally thereof for conducting electricity and pressurized fluid forwardly from said frame through said support members and to the forwardmost end portions thereof;

said second unit being connected to said forwardmost end portions of said movement support members of said first unit for lateral movement of said second unit in response to longitudinal movement of said support members of said first unit;

said inlet openings of said second unit including a first pair of inlet openings aligned with said support members of said first unit when said second unit is connected in one transverse orientation to said first unit and including a second pair of inlet openings aligned with said support members of said first unit when said second unit is connected in another transverse orientation relative to said first unit, whereby electricity and pressurized fluid is conducted to said second unit from said frame and through said support members of said first unit in either of said orientations of said second unit.

2. An assembly as in claim 1, including means interconnecting a third one of said units is connected to said forwardmost end portions of said support members of second unit to define therewith another generally T-shaped array wherein said third unit extends transversely of and is moveable laterally by said second unit; said inlet openings of said third unit including a first pair of inlet openings aligned with said support members of said second unit when said third unit is connected in one transverse orientation to said second unit, and including a second pair of inlet openings aligned with said support members of said second unit when said third unit is connected in another transverse orientation relative to said second unit, whereby electricity and pressurized fluid is conducted to said third unit from said frame and through said support members of said second unit in either of said orientations of said third unit.

3. An assembly as in claim 1, wherein said innerconnecting means includes a support plate interconnecting said forward end portions of said support members of said first one of said units and attachable to said frame of said second one of said units, said support plate and said frame having fastener-receiving openings therein, said fastener-receiving openings of said support plate of said first unit being alignable with said fastener receivng openings of said frame of said second unit in either of said transverse orientations of said second unit.

4. An assembly as in claim 1, wherein said elongate support members of each of said units extend completely through and project rearwardly from said frame of said unit and said passageways extend throughout the entire lengths of said support members, and each of said units further includes means for conducting electricity and pressurized fluid rearwardly from said frame to and into the rearmost end portions of said passageways of said support members.

5. An assembly as in claim 1, wherein said elongate support members of each of said units have sections intermediate the length thereof disposed within said frame of said unit in all positions of longitudinal movement of said support members, said passageways of said support members extending to and forwardly from said sections thereof, and each of said units further includes means disposed within the confines of said frame thereof and extending to said support member sections for conducting electricity and pressurized fluid to and into said passagewys of said support members.

* * * * *